(12) United States Patent
Ross

(10) Patent No.: US 7,070,837 B2
(45) Date of Patent: *Jul. 4, 2006

(54) SCREEN PROTECTOR

(76) Inventor: Mark Ross, 1 Parkview Ct., Newtown, PA (US) 18940

( * ) Notice: Subject to any disclaimer, the term of this patent is extended or adjusted under 35 U.S.C. 154(b) by 65 days.

This patent is subject to a terminal disclaimer.

(21) Appl. No.: 10/304,820

(22) Filed: Nov. 26, 2002

(65) Prior Publication Data

US 2003/0129355 A1   Jul. 10, 2003

Related U.S. Application Data

(63) Continuation of application No. PCT/US01/24810, filed on Aug. 8, 2001, and a continuation of application No. 09/924,743, filed on Aug. 8, 2001, now abandoned.

(51) Int. Cl.
| | |
|---|---|
| B32B 5/02 | (2006.01) |
| B32B 3/10 | (2006.01) |
| B32B 27/08 | (2006.01) |
| G02F 1/1333 | (2006.01) |
| G02F 1/3335 | (2006.01) |

(52) U.S. Cl. .......... 428/1.1; 428/1.3; 428/1.5; 428/1.54; 428/1.6; 428/1.61; 428/195; 428/323; 348/818; 348/832; 349/12; 349/58; 345/173

(58) Field of Classification Search .......... 348/818; 349/187; 428/355 RA, 500
See application file for complete search history.

(56) References Cited

U.S. PATENT DOCUMENTS

| | | | |
|---|---|---|---|
| 4,696,860 A | | 9/1987 | Epperson |
| 4,931,782 A | * | 6/1990 | Jackson ............... 345/174 |
| RE35,318 E | * | 8/1996 | Warman ............... 313/479 |
| 5,745,288 A | | 4/1998 | Miyata et al. |
| 6,152,550 A | * | 11/2000 | Yamaguchi ............ 312/223.2 |
| 6,203,892 B1 | | 3/2001 | Matsumura et al. |
| 6,247,768 B1 | * | 6/2001 | Yamaguchi ............ 312/223.2 |
| 6,250,765 B1 | * | 6/2001 | Murakami ............. 359/609 |
| 6,268,892 B1 | | 7/2001 | Nishizawa et al. |
| 6,347,796 B1 | * | 2/2002 | Grossman et al. ...... 273/148 B |
| 6,555,235 B1 | * | 4/2003 | Aufderheide et al. ..... 428/447 |
| 6,587,097 B1 | * | 7/2003 | Aufderheide et al. ..... 345/173 |
| 6,592,950 B1 | * | 7/2003 | Toshima et al. .......... 428/1.1 |

(Continued)

FOREIGN PATENT DOCUMENTS

EP   11227088   2/1998

(Continued)

OTHER PUBLICATIONS

NuShield.com web pages "Durable Screen Protectors for your PDA and Handheld Computer", 2003.*

(Continued)

*Primary Examiner*—Vivian Chen
(74) *Attorney, Agent, or Firm*—Dorsey & Whitney LLP; Scott D. Rothenberger

(57) ABSTRACT

A plastic film screen protector that prevents interference patterns from arising when the film touches the screen is described. The advantages are accomplished by the film having a slightly roughened surface so that the majority of the film facing an electronic device screen does not substantially touch the screen. These physical aberrations prevent Newton ring interference patterns and spots caused by refractive index differences between air and the film material.

29 Claims, 3 Drawing Sheets

U.S. PATENT DOCUMENTS

2002/0195910 A1* 12/2002 Hus et al. ................ 312/223.2
2003/0110613 A1*  6/2003 Ross ............................ 29/592
2003/0129355 A1*  7/2003 Ross ............................ 428/98

FOREIGN PATENT DOCUMENTS

| EP | 20010174739 |   | 9/1999  |
|----|-------------|---|---------|
| JP | 2000-304907 | * | 11/2000 |
| JP | 2001084839 A |  | 3/2001  |
| JP | 2002-328613 | * | 11/2002 |

OTHER PUBLICATIONS

Posted message from "markr@voicenet.com" regarding a coating that prevents "Newton Rings" Saturday, Apr. 29, 2000.*

Press Release from website: www.pdascreenprotectors.com.

Frequently Asked Questions from website: www.pdascreenprotectors.com.

* cited by examiner

SCREEN PROTECTOR

CROSS-REFERENCE TO RELATED APPLICATIONS

This application is based on and claims priority of International Application No. PCT/US01/24810 filed on Aug. 8, 2001, entitled "Improved Screen Protector". This application is also a continuation of U.S. application Ser. No. 09/924,743 filed on Aug. 8. 2001, now abandoned entitled "Improved Screen Protector." The contents of both are incorporated herein by reference in their entirety.

BACKGROUND OF THE INVENTION

The use of protective films of various types to protect an electronic devices has been a commonly accepted practice to prevent or minimize wear and tear or damage to the device. In general, currently available protective films use inconvenient methods to secure the film to the device, e.g., loop or hook fastener patches, or use an adhesive to attach the film. Adhesives, for example, can build in strength over time and can be difficult to remove. In addition, the removal can cause damage to devices with touch sensitive screens that are composed of several layers, separating and damaging one or more of the sensitive screen layers upon removal.

A disadvantage of currently available protective films that don't use adhesive for the protection of screens of personal digital assistants (PDAs), wireless telephones, hand held computers, and the like, is that interference patterns are formed when the screen protector is deformed by pressure exerted upon the surface, i.e., the use of a stylus to point to a function on the device. These interference patterns are commonly called Newton rings. The Encyclopedia Britannica states: "in optics, a series of concentric light- and dark-colored bands observed between two pieces of glass when one is convex and rests on its convex side on another piece having a flat surface. Thus, a layer of air exists between them. The phenomenon is caused by the interference of light waves; i.e., the superimposing of trains of waves so that when their crests coincide, the light brightens; but when trough and crest meet, the light is destroyed. Light waves reflected from both top and bottom surfaces of the air film between the two pieces of glass interfere. The rings are named after the English 17th-century physicist Sir Isaac Newton, who first investigated them quantitatively." Newton rings caused by the pressure exerted by the stylus can obscure the icon on the screen or can cause the icon image to be out of focus. This can be aggravating at the least to the operator.

Therefore, a need exists to develop a screen protection film that overcomes the aforementioned disadvantages.

BRIEF SUMMARY OF THE INVENTION

The present invention is based, at least in part, on the surprising discovery that a treated film can be overlaid upon the surface of a screen of an electronic device, such that the screen is protected and, surprisingly, when the treated film is contacted with a stylus or other object, the treated film does not suffer from the formation of Newton rings. Therefore, the present invention provides a film for a screen of an electronic device that suppresses formation of Newton rings, for example, when the polymeric film is impinged upon.

Generally, the protective film is chosen from polymeric materials readily available to one skilled in the art. For example, such polymeric films include polyester films, polyolefin films, polyvinyl chloride films, polycarbonate films, cellulosic films, acrylic films, methacrylic films, styrenic films, bisphenol A polycarbonates films or polyethylene terephthallate films. This list is noninclusive as any transparent film can be used with the following modification(s) as described herein.

One of the unique characteristics of the protective film of the present invention is the ability to prevent the formation of Newton rings when deformed by application of pressure upon the film against the electronic screen. This is generally done by a stylus or pen by the user of the electronic device. Not to be limited by theory, it is believe that the modification of the side of the film that is in contact with the electronic screen prevents the formation of the Newton rings. This modification of the surface of the film can be accomplished by many methods. In general, it has been found that the modification of the surface of the protective film that is in contact with the electronic screen should be "roughened"; that is, the surface is modified such that there is a nonuniform coating or dispersion of particles on the surface or both. This modification of the film surface prevents or at least minimizes the formation of the Newton rings by effectively inhibiting the superimposing of trains of light waves so that troughs and crests of the waves do not coincide.

The modification of the surface of the protective film that is in contact with the electronic screen can be accomplished by many methods. For example, surface can be coated with a resin. In such an embodiment, the coating should be nonuniform in thickness, or it should include particles to help substantially minimize contact with the screen, or the film can be uniform in thickness but treated with an impression roller so that the surface of the film has a roughened appearance, is patterned, is dimpled, etc. Typical resins are those known in the art that can be cured or are already cured and are dispersed in solution. A non-exhaustive list includes resins such as acrylic resins, methacrylic resins, cyanoacrylate resins, silanes, polyester resins, and polyurethanes. Additionally, the screen of the electronic device can be coated with a coating that is dried to a particulate film to create a rough surface that prevents substantial contact of the protector film with the electronic device screen.

In one embodiment of the invention, the resin can be particles. The particles can be formed from virtually any material that minimize contact of the film upon the electronic device screen such that Newton rings are eliminated or minimized when the polymer film is contacted with a stylus. The particles can be transparent, translucent or opaque. The one common factor among all types of particles is that the particle(s) create an air space that prevents the superimposing of trains of light waves so that crests and troughs coincide in the polymeric film. Exemplary particles include cured emulsion particles, silica particles, or titanium dioxide particles. In general, the particle size is between about 1 micron and about 1 millimeter in diameter. The size of the particle is not limiting. Essentially, the concentration of the particles in the resin and the particle size should be at a level that does not render the protective polymeric film to be opaque. The final protective film can have a slight opalescence, but still remains transparent.

Alternatively, the polymeric film can be formed such that at least one side is roughened. This can be accomplished by methods known in the art whereby in the manufacturing process, the film is cast onto a non-smooth surface to create a roughened surface, or when the film is cast, later treatment(s), such as air drying is done in an environment where the surface becomes roughened or non-uniform. Likewise, the polymeric film itself can contain the particles. This can be accomplished by methods known in the art, such as, for example, when the film is prepared, particles can be added to the polymeric material and extruded or cast into a sheet for film. The film thus includes the particles dispersed throughout the film, thereby helping to eliminate or minimize the potential for Newton ring formation as described above.

The protective film of the invention is generally between about 0.5 mils and about 20 mils thick. The thickness of the film should be as thick as practical for manufacture and the thinner the film, the better touch sensitivity for the operator. The protective film can also include a scratch resistant coating and/or an antiglare coating.

The present invention also provides methods for protecting the screen of electronic devices. The method is to contact a protective polymeric film onto the surface of the electronic screen, whereby the protective polymeric film suppresses formation of Newton rings when the polymeric film is placed in contact on the screen. In one aspect, the protective film is slidably contacted to the surface of the electronic screen. This is often accomplished by sliding the film between the gap between the screen and the case holding the screen.

The present invention also provides for a packaged protective film for protection of a screen of electronic devices. The package includes a polymeric film that suppresses formation of Newton rings when the polymeric film is impinged upon and instructions for placement of the film against the screen of the electronic device.

DETAILED DESCRIPTION OF THE INVENTION

Figure 1:
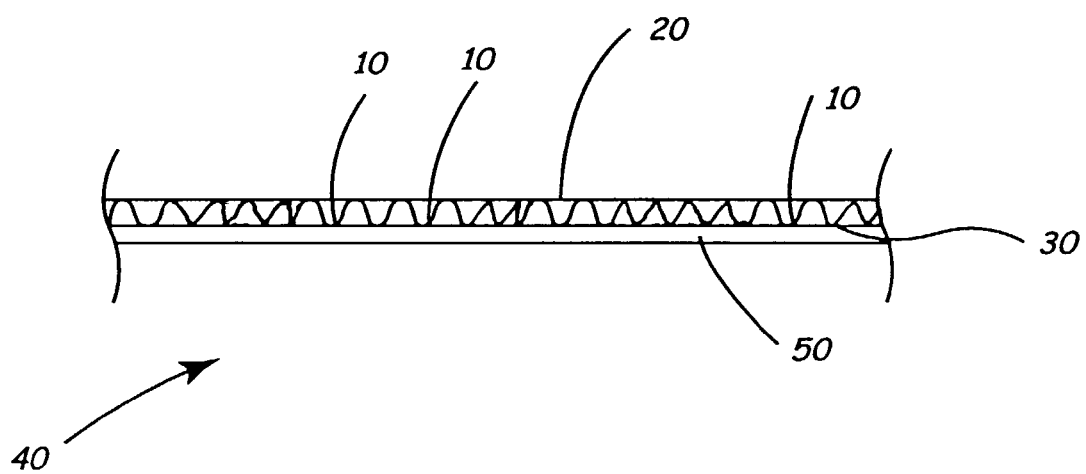
FIG. 1 depicts an embodiment of the invention showing a roughened resin surface of the polymeric film of the invention substantially non-contacting the surface of the screen of an electronic device.

The features and other details of the invention will now be more particularly described and pointed out in the claims. It will be understood that the particular embodiments of the invention are shown by illustration and not as limitations of the invention. The principal features of the invention can be employed in various embodiments without departing from the scope of the present invention. All parts and percentages are by weight unless otherwise stated.

The present invention relates to protective shields and more particularly to a new and improved film protection for screens of electronic devices such as personal digital assistants (PDA's) cellular telephones, handheld computers, and other portable electronic devices whereby the properties of the film or an adjunct coating prevent the formation of interference fringes caused by contact of the film with the screen of the device and air gaps surrounding the contact area. Such electronic devices include, for example, but are not limited to, Palm Pilot®, Handspring Visor, HP Jornada, Apple MessagePad, Handera, Kyocera phones, Compaq Ipaq, Caseo Cassiopeia, and Sony CLIE.

In one aspect, the present invention provides a film for a screen of an electronic device that suppresses formation of Newton rings when the polymeric film is impinged upon. The term "screen of an electronic device" is recognized in the art and is intended to include those surfaces on a device that are utilized by an operator to perform a task or a function, such as writing, or selecting a digitally or analog displayed character or icon, or the like. Typically, the screen of an electronic device is formed of one or more layers of materials that are liquid crystal displays (LCDs). Such materials can be pressure sensitive and are useful for hand held devices where point and touch is used to select functions or characters.

The protective films described herein are readily securable to the electronic device without the need for the use of adhesive or static adhesion. The protective polymeric films protect the viewing screen of the electronic device from dirt, scratches and damage. The protective film can be easily installed, removed and cleaned and reinstalled. The protective films are durable and do not require frequent replacement. Moreover, the protective films are relatively inexpensive and, therefore, do not cause the consumer to spend considerable sums of money to replace the protective film. This is in contrast to the cost of the electronic device itself which may cost hundreds or thousands of dollars. The prevention of damage to the electronic screen which can force the consumer to replace the electronic device is an advantage in and of itself to utilize the present invention.

The film that is useful for the elimination or for minimizing Newton rings in such applications can be prepared from various types of polymeric materials. The film or the electronic screen can be coated with a resin that causes at least one surface of the polymeric film to be roughened, or the film itself can have a roughened surface, or the film can include particles that cause at least one surface to be roughened, or the film can have a resin coating that includes particles. The term "roughened" is intended to mean that the resultant film has a surface adjacent to the electronic screen that does not substantially touch the electronic screen in any significant way, thereby affording anti-interference to light waves.

The anti-interference feature can be obtained in several ways as described throughout this specification. One approach is to use a roughened surface on at least one side of the film. This surface can be obtained by either coating the film with a coating mixture, a resin, that will create a rough surface or by roughening the surface of the film itself. Another way is to apply a coating to the surface of the device screen so that the coating will create a slightly roughened surface and keep the film screen protector from touching the screen surface in any significant way.

Not to be limited by theory, FIG. 1 graphically depicts one embodiment of the invention with a roughened resin coating. The roughened surface (10) prevents the surface of the polymeric film (20) from being in full contact with the surface of the screen (30) of the electronic device (40), e.g. not in any significant way. The aberrations between the protective film and the screen (50) of the electronic device prevent or minimize the formation of the Newton rings either when the film is not impinged upon or impinged upon by an object, i.e., a stylus. Similarly, the various protective films described throughout the specification rely, to some degree, the same physical separation between the roughened film surface and the surface of the screen of the electronic device.

The polymeric film that suppresses the formation of Newton rings, as described above, can be those polymeric films commonly used and known in the art. Such polymeric films include, for example, polyester films, polyolefin films, polyvinyl chloride films, polycarbonate films, cellulosic films, acrylic films, nylons, methacrylic films, styrenic films, bisphenol A polycarbonates films or polyethylene terephthallate films, flexible glass coated film or a flexible ceramic coated film.

Suitable flexible glass films include, for example nylon polymers treated with silica coatings as described in Knight, R.; Petrovicova, E.; Xiaohua, F.; Twardowski, T. T.; Schadler, L. S.; Hanlon, T. "Structure/property relationships and barrier performance of thermally sprayed nanoreinforced polymer coatings" Journal of Thermal Spray Technology, 10, (1) 2001; March 2001, PP. 170–171 and Schadler, L. S.; Laul, K. O.; Smith, R. W.; Petrovicova, E. "Microstructure and mechanical properties of thermally sprayed silica/nylon nanocomposites" Journal of Thermal Spray Technology 6, (4) 1997; December 1997, PP. 475–485, the teachings of which are incorporated herein by reference in their entirety.

Suitable flexible ceramic films include, for example, those prepared with diamond like qualities as described in Koskinen, J.; Lappalainen, R.; Hirvonen, J. P. "Interfacial characteristics of arc-discharge-deposited diamondlike films on 19 different substrate materials" Diamond Relat. Mater. VOL. 3, NO. 1–2, 1994, PP. 52–5 and Koskinen, J.; Lappalainen, R.; Anttila, A.; Hirvonen, J.-P. "Interfacial characteristics of arc-discharge-deposited diamond-like films on 19 different substrate materials" Diam. Relat. Mater. (Switzerland) VOL. 3, NO. 1–2, January 1994, PP. 52–5, the teachings of which are incorporated herein by reference in their entirety.

Other suitable type coatings include the use of ORMOCER (organically modified ceramic) hybrid polymers as described in Haas, K.-H.; Amberg-Schwab, S.; Rose, K.; Schottner, G. "Functionalized coatings based on inorganic-organic polymers (ORMOCERs) and their combination with vapor deposited inorganic thin films" Surface and Coatings Technology 111, (1) 1999, Jan. 10, 1999, PP. 72–79 and polymerisable silanes with non-scale ceramic particles as described in Schmidt, H. K. "SYNTHESIS AND APPLICATION OF INORGANIC/ORGANIC COMPOSITE MATERIALS" Macromolecular Symposia 1996, 101, January 1996, p.333–42, the teachings of which are incorporated herein by reference in their entirety.

These lists are non inclusive as any transparent or translucent film can be used with the modification(s) described herein. Additionally, the film can be oriented.

The film is of sufficient stiffness so that it can span a screen of an electronic device without buckling under use from pointing or writing devices.

The modulus of the film is critical to ensure that it lays flat against the screen without forming gaps in use. This means that high modulus films are required as the screen size increases. The thickness of this film should be as thin as practical for manufacture. Thinner films provide greater touch sensitivity and films are generally not thicker than about 20 mil, more preferably, less than about 10 mil in thickness, most preferably less than about 5 mil in thickness.

The polymeric film can optionally be treated with a variety of coatings such as a scratch resistant coating, which is particularly preferred. Other optional treatments, such as antiglare coatings or surface treatments, can also be used. Suitable scratch resistant and coatings are known in the art and include, for example but are not limited to, crosslinked polymers such as polyurethanes, polysilanes, polysiloxanes, acrylics, epoxies and copolymers thereof, titanium nitride, titanium carbide, silicone nitride, silicon carbide, silicone dioxide, aluminum oxide, along with combinations of any of the above. The same materials can be used as antiglare coatings where they are a matte finish, i.e., they are roughened.

The non-interference feature of the present invention can be obtained by coating the film with a resin, e.g., a curable resin, and using an impression roller to create a non-uniform surface during manufacture. The coating is then cured by any means known in the art to form a hard, substantially non-contacting surface. The polymer resin used can be any that can be used as a curable coating. Such coatings can be acrylics, silanes, unsaturated polyesters, polyurethanes and the like. Curing can then be accomplished by the means appropriate for the resin used which is known by those skilled in the art, such as by photoinitiation (ultraviolet light, infrared, laser), electron beam, or thermal initiation, and the like.

The impression roller can be any of those known in the art. Generally, the roller has a nonuniform surface, often with a design or pattern to it. Upon application of the resin to the film, the roller is contacted with the resin to impart the non-uniform surface to the resin. The resin is then cured.

In an alternative embodiment, the resin does not require a cure step. In such a system, the resin is dispersed in a solvent. The solvent can dissolve the resin or cause it to be simply a dispersion. In the case where the resin is dissolved, the solution can be coated onto the film, contacted with the impression roller and immediately dried. This provides a nonuniform surface. In the case where the resin is a dispersion, the film can be coated, dipped or sprayed with the dispersion. Upon drying, the surface of the film will be nonuniform since as the solvent evaporated, domains of resin are deposited onto the surface of the polymer film in random fashion. The use of a impression roller can optionally be used as well.

Another embodiment can be accomplished by coating the film with a resin, as described herein, containing small particles that can act in a similar fashion to keep the film substantially out of contact with the electronic device screen. The particles are preferably between $1\mu$ and 1 mm in size. The film can be cured, if required, by the methods listed above.

Suitable particles that can be used with the polymeric resin include for example, but are not limited to emulsion particles, silica particles, or titanium dioxide particles. In general, the particle size is between about 1 micron and about 2 millimeter in diameter. The size of the particle is not limiting. Essentially, the concentration of the particles in the resin and the particle size should be at a level that does not render the protective polymeric film to be opaque. The final protective film can have a slight opalescence, but still remains transparent. The particles can be formed from virtually any material that facilitate the dispersion of light through the protective film such that Newton rings are eliminated or minimized when the polymer film is contacted with a stylus. The particles can be transparent, translucent or opaque. The one common factor among all types of particles is that the particle(s) prevent the superimposing of trains of light waves so that crests and troughs coincide in the polymeric film.

Another method uses an impression roller to provide a rough surface to the film during its manufacture. The molten film is embossed by the roller as it is manufactured, and when cooled it will have a similar surface to the other means of manufacture listed above. Alternatively, the molten film can be subjected to a nonuniform flow of air which causes the surface to be nonuniform.

Still another method uses a separate coating that dries to a rough surface. This coating is applied to the screen of the electronic device or to the film surface before use. The coating can consist of a polymer resin in solution with particles as described above, or it can be inherently crystalline or rough when it dries to ensure that the protective film does not contact the surface of the screen in any substantial way. This coating can optionally be a curing resin.

One embodiment of the invention is a biaxially oriented polyester, coated on both sides with a polymeric resin (Autotype, United Kingdom) that is UV or e-beam cured. One side is smooth and the opposite side is roughened. Nominal total thickness is about 5 mil thick.

Another embodiment of the invention is a biaxially oriented polyethylene terephthallate with Terrapin S hardcoat clear on one side and Terrapin Hi Res 100 matte hardcoat on the other (Tekra, New Berlin, Wis.). Nominal total thickness is about 5 mil thick.

In use, the rough surface is in contact with the screen surface of the electronic device for the non-interference feature to function. The film is typically held in place by designing its dimensions to be slightly greater than the screen size, so that the edges of the film can be positioned partially between the screen and the case. This construction requires no adhesive or any adhesive forces to hold the film to the screen. This has the advantage that the film can be removed, reinstalled and repositioned repeatedly for cleaning purposes. It also has the advantage that upon removal, no separation of the screen layers and subsequent damage to the same can occur. It should be noted that in the preferred embodiment of this invention, the film construction will have, at the least, a scratch resistant coating on the top writing surface and the non-interference surface that contacts the electronic instrument screen.

Figure 2:
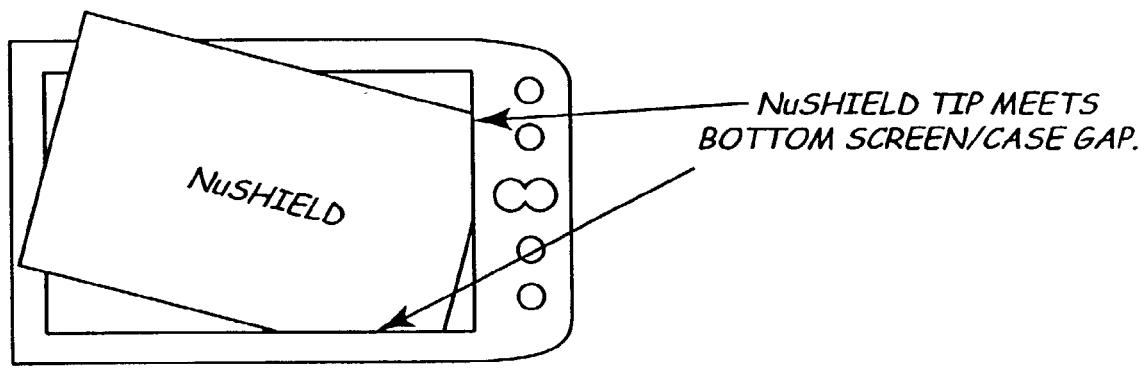
FIG. 2 depicts initial positioning of the polymeric film of the invention against the screen surface of an electronic device.
Figure 3:
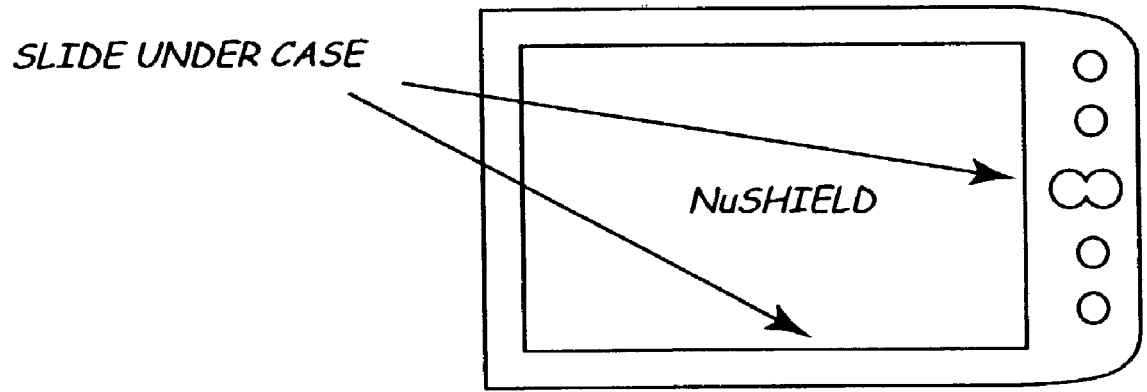
FIG. 3 depicts final positioning of the polymeric film of the invention against the screen surface of an electronic device.

Typical installation of the screen protecting film is further described in conjunction with FIGS. 2 and 3. The bottom corner of the protective film (NuShield™) is placed at the side of the screen of an electronic device. Where the film meets the case, the tip of the film is slide into the gap between the case and the screen until the corner of the film disappears into the gap. The other corner of the film is then pushed into case bottom as shown in FIG. 2. The film (20) is rotated to orient the film to the electronic device screen (50) dimensions and is pushed until the entire bottom side of the film is under the screen as far as it can go. Then the opposing sides are slipped under the opposite side of the case and adjusted accordingly as shown in FIG. 3.

EQUIVALENTS

Those skilled in the art will know, or be able to ascertain, using no more than routine experimentation, many equivalents to the specific embodiments of the invention described herein. These and all other equivalents are intended to be encompassed by the following claims. All references cited throughout the specification are hereby expressly incorporated by reference in their entirety.

What is claimed is:

1. A method for protecting a screen of an electronic device, comprising the step of contacting a replaceable protective film that includes a roughened coating that contacts the surface of the electronic screen and includes a smooth side for contact with a stylus, wherein the protective film is slidably contacted to the surface of the electronic screen, whereby the protective film suppresses formation of Newton rings when the film is installed in contact upon the screen.

2. The method of claim 1, wherein the protective film is a biaxially oriented polyethylene terephalate film that includes a scratch resistant coating disposed on the writing surface.

3. The method of claim 1, wherein the film is selected from the group consisting of polyester films, polyolefin films, polyvinyl chloride films, polycarbonate films, cellulosic films, acrylic films, methacrylic films, styrenic films, ceramic films, glass films and copolymers thereof, wherein the roughened surface of the polymeric film includes a resin disposed on the surface.

4. The method of claim 3, wherein the resin is non-uniformly disposed.

5. The method of claim 3, wherein the resin is selected from the group consisting of acrylic resins, methacrylic resins, cyanoacrylate resins, silanes, polyester resins, and polyurethanes, ceramics and copolymers and mixtures thereof.

6. The method of claim 3, wherein the resin contains particles.

7. The method of claim 6, wherein the particles are emulsion particles.

8. The method of claim 6, wherein the particles are silica particles.

9. The method of claim 6, wherein the particles are titanium dioxide particles.

10. The method of claim 6, wherein the particles are preferably between about 1 micron and about 2 millimeter in diameter.

11. The method of claim 1, wherein the film has a thickness of between about 0.5 mils and about 20 mils.

12. The method of claim 1 wherein the film has a thickness of between about 0.5 mils and about 10 mils.

13. The method of claim 1, further comprising a scratch resistant coating disposed on the surface upon which the stylus is contacted.

14. The method of claim 1, further comprising an anti-glare coating disposed on the surface upon which the stylus is contacted.

15. The method of claim 1, wherein the film is a bisphenol A polycarbonate or a polyethylene terephalate film, wherein the roughened surface of the film that contacts the electronic screen includes a resin disposed intermittently on the surface.

16. The method of claim 15, wherein the film is biaxially oriented.

17. The method of claim 15, wherein the resin is uniformly disposed.

18. The method of claim 15, wherein the resin is non-uniformly disposed.

19. The method of claim 15, wherein the resin is selected from the group consisting of acrylic resins, methacrylic resins, cyanoacrylate resins, silanes, polyester resins, and polyurethanes.

20. The method of claim 19, wherein the resin contains particles.

21. The method of claim 20, wherein the particles are cured emulsion particles.

22. The method of claim 20, wherein the particles are silica particles.

23. The method of claim 20, wherein the particles are titanium dioxide particles.

24. The method of claim 20, wherein the particles are preferably between about 1 micron and about 1 millimeter is diameter.

25. The method of claim 15, wherein the film has a thickness of between about 1 mil and about 10 mils.

26. The method of claim 15 wherein the film has a thickness of between about 1 mil and about 10 mils.

27. The method of claim 15, further comprising a scratch resistant coating disposed on the surface upon which the stylus is contacted.

28. The method of claim 15, further comprising an antiglare coating disposed on the surface upon which the stylus is contacted.

29. The method of any claims 1 and 2–28 wherein the protective film does not adhesively adhere to the screen.

* * * * *